(12) United States Patent
Buccellato et al.

(10) Patent No.: US 6,861,141 B2
(45) Date of Patent: Mar. 1, 2005

(54) PAVEMENT MARKING ARTICLE AND RAISED PAVEMENT MARKER THAT USES PRESSURE SENSITIVE ADHESIVE

(76) Inventors: Gina M. Buccellato, P.O. Box 33427, St. Paul, MN (US) 55133-3427; Cristina U. Thomas, P.O. Box 33427, St. Paul, MN (US) 55133-3427; Bimal V. Thakkar, P.O. Box 33427, St. Paul, MN (US) 55133-3427; Greggory S. Bennett, P.O. Box 33427, St. Paul, MN (US) 55133-3427; Sithya S. Khieu, P.O. Box 33427, St. Paul, MN (US) 55133-3427; Gary R. Miron, P.O. Box 33427, St. Paul, MN (US) 55133-3427

( * ) Notice: Subject to any disclaimer, the term of this patent is extended or adjusted under 35 U.S.C. 154(b) by 150 days.

(21) Appl. No.: 10/225,755

(22) Filed: Aug. 22, 2002

(65) Prior Publication Data

US 2003/0091815 A1 May 15, 2003

Related U.S. Application Data

(60) Division of application No. 09/069,575, filed on Apr. 29, 1998, now abandoned, which is a continuation of application No. 08/881,652, filed on Jun. 24, 1997, now abandoned, and a continuation-in-part of application No. 08/760,356, filed on Dec. 4, 1996, now abandoned.

(51) Int. Cl.$^7$ ............................... E01F 9/06; C09J 7/02
(52) U.S. Cl. .................... 428/355 EN; 404/14; 404/20; 428/343; 428/356; 428/354; 428/355 BL
(58) Field of Search ................................. 428/343, 356, 428/355 BL, 354, 355 EN; 404/14, 20

(56) References Cited

U.S. PATENT DOCUMENTS 3,332,327 A 7/1967 Heenan
3,451,537 A * 6/1969 Freeman et al. ............... 206/59

(List continued on next page.)

FOREIGN PATENT DOCUMENTS

EP 0125785 11/1984

(List continued on next page.)

OTHER PUBLICATIONS

JD Ferry, Viscoelastic Properties of Polymers, 2d Ed., pp. 292–319.

Primary Examiner—Daniel Zirker
(74) Attorney, Agent, or Firm—Carolyn A. Fischer

(57) ABSTRACT

A pavement marking article that has an adhesive composition for adhering the article to a pavement substrate, where the adhesive composition includes a reaction product of an acrylic acid ester of a monohydric alcohol whose homopolymer has a Tg less than 0° C., a non-polar ethylenically unsaturated monomer, and 0–10 parts by weight of a polar ethylenically unsaturated monomer. Preferably the amount of the acrylic acid ester is about 60–90 parts by weight, and the amount of the non-polar ethylenically unsaturated monomer is about 10–40 parts by weight.

Also, a raised pavement marker that comprises:
(a) a pavement marker body having upper and lower surfaces and an apparent flexural modulus of at least about 50,000 psi and
(b) a pressure sensitive adhesive layer disposed upon the lower surface of the marker, wherein the adhesive has:
   (i) a transition region that begins at a frequency of about 10,000 radians/s or more and extends to a frequency of about 100 radians/s or less at about 25° C.; and
   (ii) a minimum shear modulus of about $1 \times 10^5$ Pa at an impact frequency of about 100 radians/s at 25° C.; and
   (iii) a shear modulus value of about $2 \times 10^4$ to $2 \times 10^5$ Pa at a frequency of 1 rad/sec at 25° C.

Raised pavement markers that use a pressure sensitive adhesive meeting parameters (i)–(iii) can demonstrate good adhesion to roadways and are capable of withstanding repeated impacts from motor vehicle tires.

11 Claims, 6 Drawing Sheets

U.S. PATENT DOCUMENTS

| | | |
|---|---|---|
| 3,700,305 A | 10/1972 | Bingham |
| 3,758,192 A | 9/1973 | Bingham |
| 4,025,159 A | 5/1977 | McGrath |
| 4,117,192 A | 9/1978 | Jorgenson |
| 4,299,874 A | 11/1981 | Jones et al. |
| 4,329,384 A | 5/1982 | Vesley et al. |
| 4,330,590 A | 5/1982 | Vesley |
| 4,490,432 A | 12/1984 | Jordan |
| 4,521,129 A | 6/1985 | Krech et al. |
| 4,534,673 A | 8/1985 | May |
| 4,626,127 A | 12/1986 | May |
| 4,726,706 A | 2/1988 | Attar |
| 4,875,798 A | 10/1989 | May |
| 4,906,523 A | 3/1990 | Bilkadi et al. |
| 4,938,563 A | 7/1990 | Nelson et al. |
| 4,974,990 A | 12/1990 | Anderson et al. |
| 4,988,541 A | 1/1991 | Hedblom |
| 4,991,994 A | 2/1991 | Edouart |
| 5,082,715 A | 1/1992 | Lasch et al. |
| 5,194,113 A | 3/1993 | Lasch et al. |
| 5,227,221 A | 7/1993 | Hedblom |
| 5,310,278 A | 5/1994 | Kaczmarczik et al. |
| 5,340,231 A | 8/1994 | Steere et al. |
| 5,374,465 A | 12/1994 | Fulcomer |
| 5,391,015 A | 2/1995 | Kaczmarczik et al. |
| 5,403,115 A | 4/1995 | Flader |
| 5,422,162 A | 6/1995 | Passarino et al. |
| 5,425,596 A | 6/1995 | Steere et al. |
| 5,450,235 A | 9/1995 | Smith et al. |
| 5,453,320 A | 9/1995 | Harper et al. |
| 5,460,115 A | 10/1995 | Speer et al. |
| 5,468,795 A | 11/1995 | Guder |
| 5,536,569 A | 7/1996 | Lasch et al. |
| 5,539,033 A | 7/1996 | Bredahl et al. |
| 5,602,221 A | 2/1997 | Bennett et al. |
| 5,616,670 A | 4/1997 | Bennett et al. |
| 5,643,655 A | 7/1997 | Passarino |
| 5,654,387 A | 8/1997 | Bennett et al. |
| 5,667,335 A | 9/1997 | Khieu et al. |
| 5,708,110 A | 1/1998 | Bennett et al. |
| 5,756,584 A | 5/1998 | Bennett et al. |
| 5,883,149 A | 3/1999 | Bennett et al. |
| 5,906,889 A | 5/1999 | Miron |
| 6,063,838 A | 5/2000 | Patnode et al. |
| 6,126,360 A | 10/2000 | May et al. |

FOREIGN PATENT DOCUMENTS

| | | |
|---|---|---|
| EP | 0279204 | 8/1988 |
| WO | WO 95/13328 | 5/1995 |
| WO | WO 95/13331 | 5/1995 |
| WO | WO 96/21704 | 7/1996 |
| WO | WO 96/36770 | 11/1996 |
| WO | WO 96/36771 | 11/1996 |
| WO | WO 96/41844 | 12/1996 |
| WO | WO 92/15756 | 9/1998 |

* cited by examiner

PAVEMENT MARKING ARTICLE AND RAISED PAVEMENT MARKER THAT USES PRESSURE SENSITIVE ADHESIVE

RELATED U.S. APPLICATION DATA

This application is a Division of Continuation-in-part application Ser. No. 09/069,575, filed Apr. 29, 1998 ABN which is a Continuation application of Ser. No. 08/881,652, filed Jun. 24, 1997, now abandoned, and a Continuation-in-part of application Ser. No. 08/760,356, filed Dec. 4, 1996, now abandoned.

BACKGROUND

The invention relates to adhering an article to a substrate such as a pavement substrate.

Pavement markings convey information to motorists and pedestrians and assist in controlling motor vehicle, bicycle, and pedestrian traffic. Pavement markings have been attached to pavement substrates using adhesives e.g., pressure-sensitive adhesives, to prevent the markings from becoming dislodged. Road surfaces present a considerable challenge for adhesive attachment because they vary widely in terms of surface properties, i.e., the underlying material may be asphalt or cement concrete and may vary in aggregate type, age, temperature, moisture content and oil content. Although a variety of adhesives have been used in pavement marking applications, acrylic adhesives generally have not been used because they are moisture sensitive and tend to fail in the presence of water, and also generally do not adhere well to pavement substrates.

SUMMARY OF THE INVENTION

In a first aspect, the invention features a pavement marking article that has a first major surface that would be displayed when the article is positioned on a pavement substrate and a second major surface that has an adhesive composition for adhering the article to the pavement substrate. The adhesive composition includes a reaction product of an acrylic acid ester monomer of a monohydric alcohol whose homopolymer has a Tg less than 0° C., a non-polar ethylenically unsaturated monomer, and 0–10 parts by weight of a polar ethylenically unsaturated monomer. Preferably the homopolymer of the non-polar ethylenically unsaturated monomer has a solubility parameter of no greater than 10.50 and a Tg greater than 15° C., and the homopolymer of the polar ethylenically unsaturated monomer has a solubility parameter of greater than 10.50 and preferably a Tg greater than 15° C.

Preferably the amount of the acrylic acid ester is about 55–90 parts by weight (more preferably about 60–85 parts by weight), and the amount of the non-polar ethylenically unsaturated monomer is about 10–45 parts by weight (more preferably about 15–40 parts by weight), and the amount of the polar ethylenically unsaturated monomer is about 0–10 parts by weight.

Examples of suitable acrylic acid esters include isooctyl acrylate, 2-ethylhexyl acrylate, isononyl acrylate, isodecyl acrylate, decyl acrylate, lauryl acrylate, hexyl acrylate, butyl acrylate, octadecyl acrylate, and combinations thereof. Preferred acrylic acid esters are isooctyl acrylate, 2-ethylhexyl acrylate, and butyl acrylate.

Examples of suitable non-polar ethylenically unsaturated monomers include 3,3,5 trimethylcyclohexyl acrylate, cyclohexyl acrylate, isobornyl acrylate, N-octyl acrylamide, t-butyl acrylate, methyl methacrylate, ethyl methacrylate, propyl methacrylate, and combinations thereof. A preferred non-polar ethylenically unsaturated monomer is isobornyl acrylate.

Examples of suitable polar ethylenically unsaturated monomers include acrylic acid, itaconic acid, N,N dimethylacrylamide, N-vinyl-2-pyrolidone, N-vinyl caprolactam, acrylonitrile, tetrahydrofuryl acrylate, glycidyl acrylate, 2-phenoxyethylacrylate, benzylacrylate, and combinations thereof. A preferred polar ethylenically unsaturated monomer includes acrylic acid.

In one preferred embodiment, the pavement marking article includes an adhesive composition including the reaction product of an acrylic acid ester, a non-polar ethylenically unsaturated monomer, a polar ethylenically unsaturated monomer, and a crosslinking agent. Preferably the amount of crosslinking agent is about 0.01 to about 0.50 parts (more preferably about 0.05 to about 0.3 parts) per 100 parts of acrylic acid ester, non-polar ethylenically unsaturated monomer, and polar ethylenically unsaturated monomer.

In one embodiment the adhesive composition also includes a tackifier that is miscible in the adhesive composition. Preferably the tackifier is present in an amount ranging from about 1–50 parts per 100 parts acrylate containing polymer.

Preferred adhesive compositions have a Tg ranging from between about −25° C. to about +10° C.

Preferred articles include those in the form of a tape and those that are retroreflective.

The invention further features a method of marking a pavement substrate by affixing the above-described pavement marking article to a pavement substrate, or by applying the above-described adhesive composition to the pavement substrate and affixing the pavement marking article to the adhesive composition. In both cases, the adhesive composition may directly contact the pavement substrate (i.e., the pavement substrate does not require pre-treatment with a primer). This avoids the negative environmental impact caused by the volatile organic compounds that may be emitted by some primer compositions.

The invention also features a retroreflective article that has a surface provided with the above-described adhesive composition.

The pavement marking articles of this invention display good adhesion to oily substrates, and, in particular, to pavement substrates such as asphalt and cement concrete. The articles have properties that include good adhesion to damp surfaces, good oily surface adhesion, good low energy surface adhesion, hydrophobicity, and high tack. The articles also have good low temperature application properties. The articles are also able to remain adhered to a pavement substrate when subjected to the shear forces typically exerted on transverse pavement marking applications, e.g., vehicle stops, starts and turns. Other features and advantages of the invention will be apparent from the following description of the preferred embodiments thereof, and from the claims.

DESCRIPTION OF PREFERRED EMBODIMENTS

Figure 1:
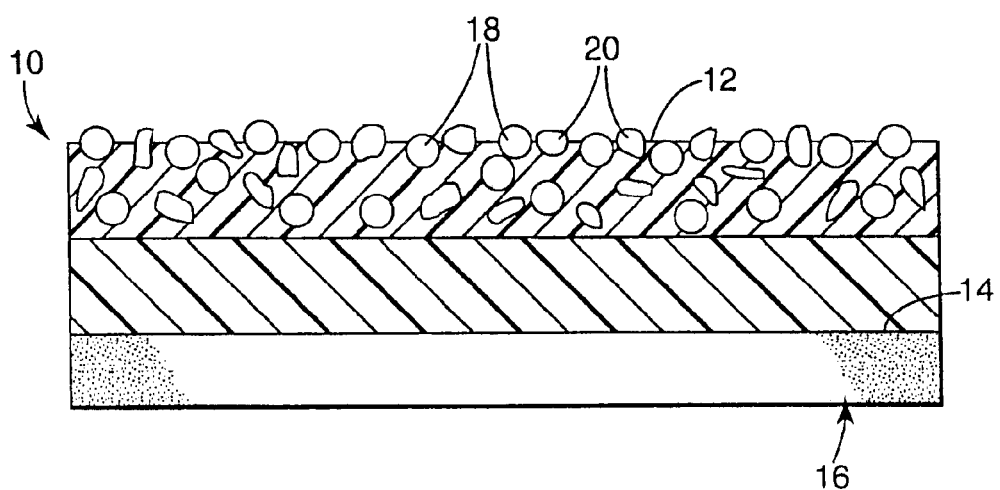
FIG. 1 is a cross-sectional view of a pavement marking article in accordance with the present invention.

FIG. 1 is a representative example of a pavement marking article 10 having (i) a top or first major surface 12 for providing visual or tactile indicia to pedestrians and motorists, and to make portions of a roadway more visible, and (ii) a bottom or second major surface 14 that is provided with an adhesive composition 16 for adhering the marking article to a pavement substrate. The pavement marking article may take the form of essentially any traffic control article that utilizes adhesive compositions such as, signs; pavement marking tapes for cross-walks, stop bars, lane and shoulder delineations, and skips; and marking tapes for berms, barriers, curbs, and the like. The article may also be a raised pavement marker such as those having a body housing with a slanted top surface and a retroreflective lens positioned thereon, or those that are arcuately shaped. Raised pavement marking articles are described, e.g., in U.S. Pat. Nos. 4,875,798 and 4,626,127. Pavement marking articles are generally described, e.g., in U.S. Pat. No. 5,453,320 (Harper et al.) and U.S. Pat. No. 4,490,432 (Jordan). Removable pavement marking articles are described, e.g., in U.S. Pat. Nos. 4,299,874 and 5,536,569.

The pavement marking article on its exposed top or first surface 12 typically provides visual or tactile indicia to a motorist and may have reflective, skid-resistant and visibility enhancing properties that are often furnished by optical elements 18, skid-resistant particles 20, and pigments and/or dyes, respectively. Surfaces having reflective elements and skid-resistant particles are well known in the art and are taught, for example, in U.S. Pat. No. 5,453,320 (Harper), U.S. Pat. No. 5,227,221 (Hedblom) and U.S. Pat. No. 5,194,113 (Lasch).

One example of a visibility enhancing surface is a surface having retroreflective properties. An article that has retroreflective properties is one that returns substantial quantities of incident light, which otherwise would be reflected elsewhere, back towards the light source. Often a surface with retroreflective properties will have a monolayer of retroreflective elements in a binder see, for example, U.S. Pat. No. 5,227,221 (Hedblom). Common retroreflective elements include microspheres, typically glass or ceramic, with reflectors thereon. Well known reflectors include dielectric reflectors, metal layers (e.g. aluminum or silver), or nacreous pigment flakes. U.S. Pat. No. 3,700,305 (Bingham) discloses retroreflective constructions comprising microspheres with dielectric reflectors. U.S. Pat. No. 3,758,192 discloses retroreflective constructions comprising nacreous pigment flakes. The reflective layer may also comprise a cube-corner retroreflective sheeting see, for example, U.S. Pat. No. 4,938,563 (Nelson), U.S. Pat. No. 5,450,235 (Smith) and U.S. Pat. No. 4,025,159 (McGrath).

The pavement marking article may include a base sheet to provide additional conformability and strength to the pavement marking article. Suitable materials for the base sheet include, e.g., rubbers, aluminum foil, polyolefins, woven scrims (e.g., durable netting) and non-woven scrims. Suitable base sheets are also described, e.g., in U.S. Pat. No. 4,490,432 (Jordan), U.S. Pat. No. 4,117,192 (Jorgenson), U.S. Pat. No. 5,194,113 (Lasch et al.), and U.S. Pat. No. 5,082,715 (Lasch et al.).

The adhesive composition is formulated to adhere the pavement marking article to a pavement substrate. Preferred adhesive compositions are capable of wetting a pavement substrate during application. Examples of suitable adhesive compositions are disclosed in U.S. patent application Ser. No. 08/150,426 (filed Sep. 9, 1995), entitled, "Pressure Sensitive Adhesives with Good Oily Surface Adhesion," and Ser. No. 08/537,034 (filed Sep. 9, 1995), entitled, "Pressure Sensitive Adhesives with Good Low Energy Surface Adhesion."

The adhesive compositions are also capable of maintaining adhesion with the pavement substrate under the shear forces typically exerted on pavement substrates. The adhesive composition can remain adhered to the pavement substrate upon the application of transverse shear forces, i.e., the forces exerted on transverse marking article applications (e.g., cross-walks) when vehicles start, stop and turn. One measure of the adhesive's ability to withstand shear forces is its loss shear modulus and its storage shear modulus. The adhesive composition preferably has a high loss shear modulus and a high storage shear modulus under impact conditions, i.e., the temperature and frequency conditions that exist when a tire impacts the pavement marking article.

The adhesive composition also preferably maintains adhesion with the pavement substrate under the environmental conditions that pavement typically encounters. These conditions include wind, water (including standing water, rain, freezing rain, snow and ice), temperature extremes, deicing and anti-icing materials, automobile fluids (e.g., gasolines, oils and antifreeze), dirt, sand, and the like.

The rheological character of the adhesive composition can be partially but usefully described by the glass transition temperature (Tg) as measured by the 1 radian/second tan delta maximum temperature. The Tg of adhesive compositions useful in the present invention is preferably in the range of about −25° C. to about +10° C., more preferably about −20° C. to about +5° C., most preferably about −15° C. to about 0° C. at one radian/second. If the Tg is too low, the adhesive composition may become too soft and may move under impact conditions. If Tg is too high, the adhesive composition's cold temperature performance may be impaired, i.e., the adhesive composition may not adhere well to the pavement substrate and may break away from the substrate upon impact.

Preferred adhesive compositions include the reaction product of 55–90 parts (more preferably 60–85 parts) of an acrylic acid ester monomer whose homopolymer has a Tg less than 0° C., 10–45 parts (more preferably 15–40 parts) of a non-polar ethylenically unsaturated monomer whose homopolymer has a solubility parameter of no greater than 10.50 and a Tg greater than 15° C., and 0–10 parts (more preferably 0–5 parts) of a polar ethylenically unsaturated monomer whose homopolymer has a solubility parameter of greater than 10.50 and a Tg preferably greater than 15° C. The resulting reaction product is an acrylate containing polymer. Preferably the reaction product has a weight average molecular weight of at least about 50,000, more preferably greater than 300,000 and most preferably between about 500,000 and 1.5 million.

The preferred acrylic acid ester is a monofunctional acrylic ester of a monohydric alcohol having from about 4 to about 18 carbon atoms in the alcohol moiety whose homopolymer has a Tg less than 0° C. Included in this class of acrylic acid esters are isooctyl acrylate, 2-ethylhexyl acrylate, isononyl acrylate, isodecyl acrylate, decyl acrylate, lauryl acrylate, hexyl acrylate, butyl acrylate, octadecyl acrylate, and combinations thereof. In the case of octadecyl acrylate, the amount is chosen such that side chain crystallization does not occur at room temperature. The preferred acrylic acid esters are isooctyl acrylate, 2-ethylhexyl acrylate, and butyl acrylate.

Preferred non-polar ethylenically-unsaturated monomers include those whose homopolymer has a solubility parameter as measured by the Fedors method of not greater than 10.50 and a Tg greater than 15° C. The non-polar nature of this monomer in combination with the other monomers, it is believed, helps improve the low surface energy adhesion, imparts hydrophobicity, oily adhesion and helps control the overall polarity of the composition. It is also believed that it improves the structural properties of the adhesive composition (e.g., cohesive strength) relative to a homopolymer of the acrylic acid ester described above. Examples of suitable non-polar monomers include 3,3,5 trimethylcyclohexyl acrylate, cyclohexyl acrylate, isobornyl acrylate, N-octyl acrylamide, t-butyl acrylate, methyl methacrylate, ethyl methacrylate, propyl methacrylate, and combinations thereof. A preferred non-polar monomer is isobornyl acrylate.

The adhesive composition may contain a limited quantity (e.g., no more than 10 parts) of a polar ethylenically unsaturated monomer whose homopolymer has a solubility parameter as measured by the Fedors method of greater than 10.50 and preferably a Tg greater than 15° C. to improve structural properties (e.g., cohesive strength). The polar monomer can add strength and stiffness to the adhesive composition but it also can be somewhat moisture sensitive. It is not desirable to include more than 10 parts of the polar monomer because the polar monomer impairs oily surface adhesion and adhesion in the presence of water. Examples of suitable polar monomers include acrylic acid, itaconic acid, certain substituted acrylamides such as N,N dimethylacrylamide, N-vinyl-2-pyrolidone, N-vinyl caprolactam, acrylonitrile, tetrahydrofuryl acrylate, glycidyl acrylate, 2-phenoxyethylacrylate, benzylacrylate, b-carboxyethyl acrylate, and combinations thereof. The preferred polar monomer is acrylic acid.

The monomer mixture can be polymerized by various conventional free radical polymerization methods, whether thermally or radiation initiated, including, e.g., solution polymerization, and bulk polymerization. Photoinitated bulk polymerization involves adding an initiator to aid in polymerization of the monomers. The type of initiator used depends on the polymerization process. Photoinitiators that are useful for polymerizing the acrylate monomers include benzoin ethers such as benzoin methyl ether or benzoin isopropyl ether, substituted benzoin ethers such as 2-methyl-2-hydroxylpropiophenone, aromatic sulfonyl chlorides such as 2-naphthalenesulfonyl chloride, and photoactive oxides such as 1-phenyl-1,1-propanedione-2-(o-ethoxycarbonyl) oxime. An example of a commercially available photoinitiator is Irgacure™ 651 available from Ciba-Geigy Corporation, believed to be 2,2-dimethoxy-1,2-diphenylethane-1-one. Generally, the photoinitiator is present in an amount of about 0.005 to 1% by weight based on the weight of the monomers. Examples of suitable thermal initiators include azobisisobutyronitrile and peroxides, e.g., benzoyl peroxide and cyclohexanone peroxide.

Solution polymerization involves combining the acrylate ester component, the non-polar ethylenically unsaturated monomer component, and the polar ethylenically unsaturated monomer component along with a suitable inert organic solvent and a free radically copolymerizable crosslinker in a reaction vessel. After the monomer mixture is charged into the reaction vessel, a concentrated thermal free radical initiator solution is added. The reaction vessel is then purged with nitrogen to create an inert atmosphere. Once purged, the solution within the vessel is heated to the activation temperature of the initiator, the initiator is added, and the mixture is stirred during the course of the polymerization reaction.

Another polymerization method is a two step free radical polymerization of a 100% solids monomer mixture. In the first step, the low viscosity monomers are mixed at the appropriate ratios and an initiator is added to the mixture. The mixture is purged with nitrogen to remove dissolved oxygen. The solution is partially polymerized to produce a syrup with moderate viscosity that can be coated easily. Further initiator and crosslinker are added to the syrup. The syrup is then coated (while excluding oxygen) at a desired thickness, usually about 0.5 to 20 mils (about 0.01 to about 0.25 mm). During the coating process the syrup is further exposed to energy to complete the polymerization and crosslink the adhesive composition. The free radical polymerization is preferably preformed by thermal or UV catalysts and the preferred energy sources are thermal or UV.

An alternative to the above two step polymerization method involves use of an extruder. In this method, a packaging material e.g., a pouch, that will not substantially adversely affect the adhesive properties of the adhesive composition when the pre-adhesive composition and packaging material are melted and mixed together, is filled with monomers and initiators, and optionally with the addition of chain transfer agents to keep the molecular weight low enough after polymerization so that the polymer can be extruded. The filled pouch is exposed to UV radiation, which produces the polymerized composition inside the pouch. The pouch and contents can then be fed to the extruder and the resulting molten composition hot melt coated onto a release liner, to yield a composition comprising a high molecular weight adhesive composition having a small percentage of pouch plastic polymer material therein, typically 3% by weight or less after which it is exposed again to low intensity UV radiation or electron beam radiation to crosslink the adhesive composition. Alternatively, the adhesive composition can be removed from the pouch, coated onto a substrate, and exposed to radiation to crosslink the adhesive. Suitable pouch materials include, e.g., ethylene-vinylacetate, ethylene acrylic acid, polypropylene, polyethylene, and ionomeric films.

The mixture of the polymerizable monomers may contain a crosslinking agent, or a combination of crosslinking agents, to increase the shear strength of the adhesive composition. Suitable crosslinking agents include, e.g., thermal, photosensitive, and radical initiating crosslinking agents.

Thermal crosslinking agents such as a multifunctional aziridine, e.g., 1,1'-(1,3-phenylenedicarbonyl)-bis-(2-methylaziridine) (CAS No. 7652-64-4), can be incorporated into the adhesive composition and activated by heat during oven drying of the coated adhesive.

Crosslinkers that rely on free radicals to carry out the crosslinking reaction can also be employed. Reagents such as, for example, peroxides serve as precursor sources of free radicals. When heated sufficiently, these precursors will generate free radicals that cause crosslinking reactions in polymer chains. A common free radical generating agent is benzoyl peroxide.

Suitable photosensitive crosslinking agents, i.e., crosslinkers that are activated by ultraviolet (UV) light, include substituted triazines such as 2,4,-bis (trichloromethyl)-6-(4-methoxyphenyl)-s-triazine, 2,4-bis (trichloromethyl)-6-(3,4-dimethoxyphenyl)-s-triazine, and the chromophore-substituted halo-s-triazines disclosed in U.S. Pat. Nos. 4,329,384 and 4,330,590 (Vesley) incorporated herein by reference. Additional useful crosslinking agents include hydrogen abstraction type photocrosslinkers such as those based on benzophenones, e.g., 4-acryloxybenzophenone, acetophenones, and anthraquinones. Other useful crosslinking agents include multifunctional alkyl acrylate monomers such as trimethylpropane triacrylate, pentaerythritol tetra-acrylate, 1,2 ethylene glycol diacrylate, 1,4 butanediol diacrylate, 1,6 hexanediol diacrylate, and 1,12 dodecanol diacrylate. Copolymerizable a-cleavage type photoinitiators such as acrylamido-functional disubstituted acetyl aryl ketones can also be employed. Various other crosslinking agents with different molecular weights between (meth)acrylate functionality would also be useful. These crosslinkers are activated by UV light generated by artificial sources such as medium pressure mercury lamps and UV black light.

Generally, when a crosslinker is used, the crosslinker is present in an amount of about 0.01 to about 0.50 parts, preferably about 0.05 to about 0.30 parts crosslinker per 100 parts of the acrylic acid ester, the non-polar ethylenically unsaturated monomer, and the polar ethylenically unsaturated monomer.

Crosslinking may also be achieved using high energy electromagnetic radiation such as gamma or electron beam radiation, in which case the addition of a crosslinking agent is not necessary. Preferably the adhesive composition is about 20% to about 98%, more preferably about 40% to about 80% crosslinked.

The adhesive composition may also include a tackifier. The tackifier is preferably miscible with the acrylate containing polymer, i.e., macroscopic phase separation does not occur, in order to improve the properties of the adhesive composition. Preferably, the adhesive composition is free of microscopic phase separation as well. The total amount of tackifier is preferably about 1 to about 50 parts per 100 parts of the acrylate containing polymer. The particular amount of tackifier depends on the composition of the acrylate containing polymer and is generally selected to maximize adhesion as well as wetting of the substrate without compromising desired shear strength and low temperature performance.

A wide variety of tackifiers may be used. The most commonly used tackifiers in acrylic pressure-sensitive adhesives include terpenes (e.g., Zonarez A-100, Piccolyte 5115 (commercially available from Hercules, Wilmington, Del.), Piccolyte A-115 (Hercules), Piccolyte A-135 (Hercules) and Piccofyn A-135 (Hercules)), phenolics, rosins, rosin esters (e.g., Hercoflex 400 (Hercules), Permalyn 85), esters of hydrogenated rosins (e.g., Foral 85 and RegalRite 355 (Hercules)), synthetic hydrocarbon resins, hydrogenated $C_5$ resins (e.g., Escorez 5340, 5300, and 5380 (commercially available from Exxon, Baton Rouge, La.)), hydrogenated $C_9$ resins (e.g., Regalrez resins 1085, 1094, 1128, 6108 and 3102 (Hercules), and Arkon P90 and P115 (commercially available form Arkawa, Japan)), $C_5$ hydrocarbons (e.g., Hercotac RT110, 100S, and RT400 (Hercules), Escorez 1310 (Exxon), hydrogenated aromatics (e.g., Exxon FCJ-90-019 (Exxon) and combinations thereof. In cases where the amount of polar ethylenically unsaturated monomer is small, the class of hydrogenated $C_9$ resin tackifiers known under the tradename "Regalrez" resins are preferred. These tackifiers are produced by polymerization and hydrogenation of pure monomer hydrocarbon feed stock and include Regalrez™ resins 1085, 1094, 1128, 6108 and 3102, with 6108 being preferred.

The adhesive composition is preferably in the form of a coating applied to the surface of the pavement marking article. The adhesive coating may be continuous or discontinuous, e.g., a dot or stripe pattern. The thickness of the adhesive coating on the pavement marking article is preferably sufficient to permit the article to adhere to a pavement substrate. The thickness of the adhesive coating may vary depending on the application, i.e., the pavement substrate and the article substrate. The adhesive coating thickness is generally about 127 $\mu$m (5 mils) to about 508 $\mu$m (20 mils), more generally about 254 $\mu$m (10 mils).

The adhesive composition may be coated onto a release-treated surface and then laminated to a surface of a pavement marking substrate. Alternatively, the adhesive composition may be applied directly to a surface of the pavement marking article, and optionally a release-treated surface can then be laminated to the adhesive composition.

Methods for marking pavement substrates include affixing the adhesive coated surface of the pavement marking article to the pavement substrate, and, alternatively, applying the adhesive composition to the pavement substrate and then affixing the pavement marking article to the adhesive. Examples of suitable methods for affixing raised pavement marking articles to a pavement substrate are described in U.S. Pat. No. 4,974,990.

Preferably the pavement marking article is affixed directly to the pavement substrate, i.e., a substrate that has not been primed. The article may, however, be affixed to a pavement substrate that has been first primed with a primer composition suitable for use in pavement marking applications. For environmental reasons, the primer composition preferably contains no volatile organic components. Primer compositions are well known in the art and are described, for example, in U.S. Pat. No. 4,906,523 (Bilkadi et al.), and U.S. Pat. No. 5,468,795 (Guder et al.). Additional examples of primer compositions include, Stamark® E-44, Stamark® E-44T and P-46, Stamark® SP-44 sprayable adhesive, Scotch-Lane pavement Preparation Adhesive P-40 (available from Minnesota Mining and Manufacturing, St. Paul, Minn.), #BL 33 and #BL 52 (Brite-Line, Bedford, Mass.), ATM primer and ATM contact cement (Advanced Traffic Markings, Roanoke Rapids, N.C.).

The invention is further described in the following examples. It is to be understood, however, that while the examples serve this purpose, the particular ingredients and amounts used, as well as other details, are not to be construed to limit the invention's scope and may be varied.

EXAMPLES

Test Procedures

Test procedures used in the examples include the following.

Impact Shear Resistance Test

Impact shear resistance is determined using a vehicle wear simulator designed to simulate shear and wear conditions experienced by a pavement marking located near an intersection. The simulator has a test area consisting of a horizontal annular ring about 6 feet (1.8 meters) in diameter and about 1 foot (0.3 meter) in width having an unprimed concrete surface. Samples of pavement marking material are cut into 2 by 6 inch (5 by 15 centimeter) rectangles and mounted in the annular ring with the long axis of the sample being aligned with the radial axis of the ring. Each sample is then rolled by hand with a rubber roller to provide good contact to the unprimed pavement surface and its initial position noted. Two tires, B.F. Goodrich P165/80R13 steel belted radials with an inflation pressure of 30 pounds/inch$^2$ ($2.1 \times 10^5$ Pascals), are positioned vertically above the test area at opposite ends of a rigid connecting frame. Downward pressure is applied to the connecting frame pneumatically to provide a load of between about 420 and about 440 pounds (about 190 and about 200 kilograms) on each tire. The frame is rotated, driving the tires across the surface of the test area at 5 revolutions/minute which is equivalent to a linear tire speed of about 1 mile/hour (2 kilometers/hour), simulating the high impact shear and abrasion forces encountered at high temperature. Impact Shear resistance is evaluated as the lateral movement of the sample on the substrate following a specified number of tire hits.

Method of Measuring Glass Transition Temperature Tg

The glass transition temperature, Tg, of the adhesive composition can be measured by first determining its storage (G') and loss shear moduli (G"). Storage and loss shear moduli can be measured by placing a 0.5 to 2 mm sample of adhesive composition on parallel plates 1 inch (2.54 cm) in diameter. A first set of measurements is taken at 25° C. Using liquid nitrogen, measurements are taken starting at 10° C. down to −40° C. at 10° increments. There is roughly a 15 minute interval between measurements at different temperatures to allow the adhesive sample to relax and attain equilibrium at the set temperature. The frequency sweeps range from 0.063 to 63 radians per second at each temperature. The normal force is held constant and the torque is about 20 gm-cm. G' and G" are obtained at each temperature for each sample. The ratio of G"/G', a unitless parameter typically denoted "tan d", is plotted versus temperature. The maximum point (point where the slope is zero) in the transition region between the glassy region and the rubbery region of the tan d curve, if well defined, determines the Tg of the adhesive composition at that particular frequency.

Method of Measuring Gel Fraction

Gel fraction is measured by placing an adhesive sample weighing about 0.3 grams on a stainless steel fine mesh wire screen. The screen is folded and immersed in about 100 ml of tetrahydrofuran for 3 days at room temperature. On removal from the solvent, the adhesive samples are dried at about 93° C. (200° F.) for 30 minutes and re-weighed. The uncrosslinked portions of the adhesive are extracted by the solvent. The gel fraction is the ratio of the final adhesive weight to its original weight.

Adhesive Preparation

Example 1

100 parts by weight of iso-octyl acrylate (IOA), isobornyl acrylate (IBA) and acrylic acid (AA) with a monomer ratio of 76/23/1 (IOA/IBA/AA) were blended with 0.04 parts of benzildimethylketal (KB-1, commercially available from Sartomer, Westchester, Pa.) photoinitiator, purged with nitrogen, and partially photopolymerized under an ultraviolet (UV) light source to yield an acrylate syrup having a viscosity of about 4000 centipoise (cPs). 0.16 parts of additional benzildimethylketal photoinitiator, 0.15 parts of 2,4-bis(trichloromethyl)-6-(4-methoxyphenyl), and 20 parts Regalrez™ 6108 tackifier resin were added to the acrylate syrup and mixed thoroughly until all of the components had completely dissolved. After mixing, the blend was knife-coated at a 254 μm (10 mils) thickness onto a silicone-treated polyethylene-coated paper release liner. The composite was then exposed to ultraviolet radiation having a spectral output from 300–400 nanometers (nm) with a maximum at 351 nm in a nitrogen rich environment (<200 ppm oxygen). The average intensity was about 2.07 milliwatts per square centimeter (mW/cm²) resulting in a total energy of 646 mJ/cm². The adhesive composition was then laminated to a Stamark® N420 backing (available from Minnesota Mining and Manufacturing).

Four 1 by 12 foot samples were then placed directly on a pavement substrate in an intersection. After twelve months, three of the samples remained intact on the substrate with no visible damage or movement and one sample showed approximately 40% loss.

Example 2

A portion of the adhesive composition of Example 1 was laminated to a Stamark® 5760 backing (available from Minnesota Mining and Manufacturing). 4"×10' samples of the adhesive coated backing were installed transverse to traffic on an unprimed asphalt substrate. Thirteen months later the samples were still intact.

Example 3

An adhesive composition was prepared and applied to a Stamark® N420 backing according to the method described in Example 1 with the exception that the ratio of IOA/IBA/AA was 76/22/2 (IOA/IBA/AA). The adhesive coated backing was partitioned into three samples.

The three samples were subjected to the above described impact shear resistance test, except that the tires were driven across the surface of the test area at 8 revolutions/minute with 15 pounds per square inch (psi); 105 KPascals, downward pressure for the first 1000 hits after which the speed was ramped up to 60 revolutions/minute with 20 psi of downward pressure, which is equivalent to a linear tire speed of about 35 miles per hour. After 300,000 hits two of the three samples remained intact and undamaged. One of the three samples showed slight damage on the leading edge of the sample.

Example 4

100 parts by weight of iso-octyl acrylate (IOA), isobornyl acrylate (IBA) and acrylic acid (AA) with a monomer ratio of 80/17/3 (IOA/IBA/AA) were mixed together in a jar under a constant nitrogen purge and transferred to a plastic pouch (ethylene-vinyl acetate). The filled pouch was exposed to a UV blacklight to completely polymerize the adhesive. The pouch and contents were then fed to a counter-rotating twin-screw extruder (Leistritz, Somerset, N.J.) at 149° C. (300° F.) and hot melt coated onto a release liner. The extruded coating was exposed to a 4 megarad electron beam to crosslink the adhesive composition. The gel fraction was 71. The adhesive coated liner was then laminated to a Stamark® 5760 backing and cut into four 2 by 6 inch (5.1×15.2 cm) sections.

Example 5

An adhesive composition was prepared, extruded onto a release liner, and laminated onto a Stamark® 5760 backing according to the method described in Example 4, with the exception that the ratio of IOA/IBA/AA was 75/22/3 and the extruded coating was subjected to a 5 megarad electron beam instead of a 4 megarad beam. The gel fraction was 71. The backing was then cut into four 2 by 6 inch (5.1×15.2 cm) sections.

Example 6

An adhesive composition was prepared, extruded onto a release liner, and laminated onto a Stamark® 5760 backing according to the method described in Example 4, with the exception that the ratio of IOA/IBA/AA was 67/30/3 and the extruded coating was subjected to a 2 megarad electron beam instead of a 4 megarad beam. The gel fraction was 51. The backing was then cut into four 2 by 6 inch (5.1×15.2 cm) sections.

Example 7

An adhesive composition was prepared, extruded onto a release liner, and laminated onto a Stamark® 5760 backing according to the method described in Example 4, with the exception that the ratio of IOA/IBA/AA was 67/30/3. The gel fraction was 59. The backing was then cut into four 2 by 6 inch (5.1×15.2 cm) sections.

Example 8

An adhesive composition was prepared as in Example 4, with the exception that the ratio of IOA/IBA/AA was 67/30/3 and the extruded coating was subjected to a 6 megarad electron beam instead of a 4 megarad beam. The gel fraction was 71. The backing was then cut into four 2 by 6 inch (5.1×15.2 cm) sections.

Each of the four samples of Examples 4–8 was tested pursuant to the above-described impact shear resistance test procedure. After 18,000 hits the samples were soaked in water and then subjected to 4,000 hits under a constant spray of water. The resulting average impact shear data are shown in Table I (movement in millimeters).

TABLE I

| | Sample | | | | |
|---|---|---|---|---|---|
| Hits | 4 | 5 | 6 | 7 | 8 |
| 4000 | 0 | 0 | 0 | 0 | 0 |
| 8000 | 0 | 0 | 0 | 0 | 0 |
| 18000 | 0 | 0 | 0 | 0 | 0 |
| 22000 | * | 0 | 0 | 0 | 0 |

*Three of the four samples had no movement, one sample failed.

The data in Table I demonstrate that the samples passed the impact shear test.

The glass transition temperature of each of the adhesive compositions from Examples 1–8 was measured according to the above-described method. The resulting Tg data are reported in Table II (° C.). The gel fraction of the adhesive compositions from Examples 4–8 was measured according to the above-described method. The resulting data are reported in Table II (% Gel).

TABLE II

| Sample | Tg | % Gel |
|---|---|---|
| 1 | −7 | 65 |
| 2 | −7 | 65 |
| 3 | −2 | — |
| 4 | −20 | 71 |
| 5 | −12 | 71 |
| 6 | −5 | 51 |
| 7 | −5 | 59 |
| 8 | −5 | 71 |

The data in Table II show the glass transition temperature and percent gel or crosslinking of the adhesive composition.

This invention also pertains to a durable raised pavement marker that is adhered to the pavement surface using a pressure-sensitive adhesive.

BACKGROUND

Raised pavement markers are commonly used as highway traffic markings that provide road lane delineation. The raised markers allow drivers of oncoming vehicles to correctly position themselves on the roadway, particularly at night or under conditions of poor visibility. Raised markers have the advantage of providing enhanced visibility, particularly when they incorporate retroreflective materials, and of also providing an audible signal to the driver when their automobile strays beyond the delineated area.

Raised pavement markers have been adhered to pavement surfaces using an asphalt or an epoxy type adhesive. Both of these adhesive systems, however, have certain drawbacks. For example, the bituminous asphalt type adhesive is cumbersome to apply and exposes workers to dangers involved with hot asphalt. The epoxy resin type adhesives require precise mixing and careful application of the materials and therefore can also be inefficient to provide adequate care for bond making.

Pressure-sensitive adhesives (PSAs) have been used in some pavement marking applications. PSAs, for example, have been used with durable pavement marking tapes and other such products (see e.g. U.S. patent application Ser. No. 08/760,356, filed Dec. 4, 1996). While there have been attempts to use PSAs for adhesion of raised pavement markers to roadway surfaces, these attempts have not been completely successful. Temporary raised pavement markers that are generally made of elastomeric or rubbery materials have been adhered to roadway surfaces for periods of about 3 to 6 months. For such markers, the adhesive pad is generally placed on one surface of the "L" shaped marker. When the marker is hit by a tire, the elastomeric material collapses and then bounces back up when the vehicle has passed. These markers are generally used in construction work areas where long term adhesion is not required. Examples of this type of marker are disclosed in U.S. Pat. No. 4,521,129, U.S. Pat. No. 4,534,673, U.S. Pat. No. 5,460,115 and U.S. Pat. No. 4,626,127.

Attempts to use a butyl rubber type adhesive for adhering durable raised pavement markers to road surfaces have encountered difficulties. One successful application has been where durable markers are used for special marking purposes. Normally, this special use marker is placed in the middle of the road where it does not get hit by vehicles. If a durable raised pavement marker could be adhered to a road surface for long periods of time using a pressure-sensitive adhesive, it would provide great advantages in convenience, safety, and efficiency of application.

SUMMARY OF THE INVENTION

We have discovered pressure-sensitive adhesive systems that can be used to durably adhere raised pavement markers to pavement surfaces. These pressure-sensitive adhesives (PSAs) share particular shear modulus properties at various impact frequencies that correspond to the impact of a tire on the marker. In brief summary, the present invention provides a raised pavement marker that comprises: (a) a pavement marker body having upper and lower surfaces and an apparent flexural modulus of at least about 50,000 PSI ($3.45 \times 10^8$ (Pascals) (Pa)) and (b) a pressure sensitive adhesive layer disposed upon the lower surface of the marker, wherein the adhesive has: (i) a transition region that begins at a frequency of about 10,000 radians/s or more and extends to a frequency of about 100 radians/s or less at about 25° C.; and (ii) a minimum shear modulus of about $1 \times 10^5$ Pa at an impact frequency of about 100 radians/s at 25° C.; and (iii) a shear modulus value of about $1 \times 10^4$ to $2 \times 10^5$ Pa at a frequency of 1 radian per second (rad/sec) at 25° C.

Applicants have discovered that by placing the above-recited pressure sensitive adhesive on the lower surface of the pavement marker body, the marker will have good initial adhesion to the road surface and can maintain that adhesion over an extended period of time after exposure to repeated impacts from motor vehicle tires.

The present invention overcomes the disadvantages associated with hot tar adhesives. There is no need for the contractor to wear gloves to protect themselves from the hot tar, and there is no need for heavy equipment including a tank, heater, pump, dispenser, and truck to haul these items.

The present invention also is advantageous over epoxy adhesives in that it does not require precision in mixing to achieve stochiometric ratios required for adequate bonding. In addition, there are no unreacted materials that need to be disposed of in an environmentally sound manner.

Applicants' PSA raised markers are readily applied and therefore improve worker safety by reducing exposure to traffic. Because the inventive PSA markers also are amenable to mechanical application with significantly less human involvement, there is still further improvement to worker safety. In short, the inventive raised pavement markers provide extraordinary benefits.

DETAILED DESCRIPTION OF ILLUSTRATIVE EMBODIMENTS

The durable raised pavement marker (DRPM) useful in the invention normally has a lifetime of at least about six months, preferably about 2–3 years, and has a substantially flat bottom. These types of markers generally have an apparent flexural modulus ranging from about 50,000 pounds per square inch (psi) ($3.45 \times 10^8$ Pa) to 200,000 psi ($1.38 \times 10^9$ Pa). The DRPM disclosed in WO 96/36770 and WO 96/3677, with an apparent modulus of at least about 80,000 psi ($5.52 \times 10^8$ Pa) is one example of a suitable durable marker. The flat bottom provides the marker with sufficient surface area for the application of a pressure-sensitive adhesive.

The apparent flexural modulus of the marker is a measurement of the marker's stiffness. This value can be obtained by testing the marker in a 3-point bending test as specified in ASTM D790. Higher apparent modulus numbers correspond to higher marker stiffness. Raised pavement markers used in the invention preferably have an apparent flexural modulus of at least about 50,000 psi ($3.45 \times 10^8$ Pa). Preferably, the durable raised pavement marker has an apparent flexural modulus of about 150,000 psi ($1.03 \times 10^9$) to 200,000 psi ($1.38 \times 10^9$ Pa). For a further discussion of apparent flexural modulus, see U.S. patent application Ser. Nos. 08/445,285 and 08/445,286, filed May 19, 1995.

The marker can be constructed as a one-piece molded article or as a multi-component article that may include retroreflective elements for improved visibility. If the marker has a multi-component construction, the top of the marker is made from a material having a high flexural modulus and the bottom or base of the marker is typically made from materials that have a high Youngs modulus. The Youngs modulus will generally range from about $2.07 \times 10^8$ Pa to $3.45 \times 10^9$ Pa. These high Youngs modulus values will generally prevent the base material from stretching which could lead to premature separation of the marker from the pavement surface. The multi-component construction allows for the marker to be designed so that the marker's properties can be adapted to the particular road conditions. For example, because the top portion of the marker is directly impacted by a vehicle's tires, the top material can be selected to have improved impact resistance by use of a less rigid material, and the base material can be selected to have a higher rigidity or high tensile modulus to compensate for the loss of rigidity in the shell material. The fact that the shell and base material are joined together in a single marker allows the marker as a whole to have the desired properties. Examples of pavement markers made that use this concept to provide desired apparent flexural modulus can be found in WO 96/36770.

Although the above-noted markers are preferred because they possess desired apparent flexural modulus, other markers may also be used in conjunction with the pressure sensitive adhesives that possess the parameters defined herein. Such markers may include, for example, those disclosed in the following patents: U.S. Pat. Nos. 3,332,327, 4,726,706, 5,082,715, 5,340,231, 5,403,115, 5,425,596 and 5,460,115.

The pressure-sensitive adhesive used in the marker of the invention provides good initial adhesion to the road upon application and maintains its adhesion to the road over time and upon exposure to multiple and repeated vehicle impacts. The adhesives found to be useful in durable raised pavement marker applications have particular shear modulus values at impact frequencies that correspond to the time under stress that the marker experiences when it is impacted on the road.

In a first embodiment of the invention, the durable, raised pavement marker may comprise: (a) a pavement marker body having upper and lower surfaces and an apparent modulus of at least about $3.45 \times 10^8$ Pa and (b) a pressure sensitive adhesive layer disposed upon the lower surface of the marker, wherein the adhesive comprises: (i) about 50 to 70 wt-% polyoctene and (ii) about 30 to 40 wt-% tackifier. In a second embodiment of the invention, the pressure sensitive adhesive layer may comprise: (i) about 60 to 85 wt-% isooctyl acrylate; (ii) about 3 to 20 wt-% isobornyl acrylate; (iii) about 0.1 to 3 wt-% acrylic acid; and (iv) about 10 to 25 wt-% tackifier. In a third embodiment, the pressure sensitive adhesive layer may comprise: (i) about 40 to 60 wt-% polybutadiene and (ii) about 40 to 60 wt-% tackifier. In a fourth embodiment, the pressure sensitive adhesive layer can comprise: (i) about 40 to 60 wt-% natural rubber and (ii) about 40 to 60 wt-% of a tackifier.

Figure 2:
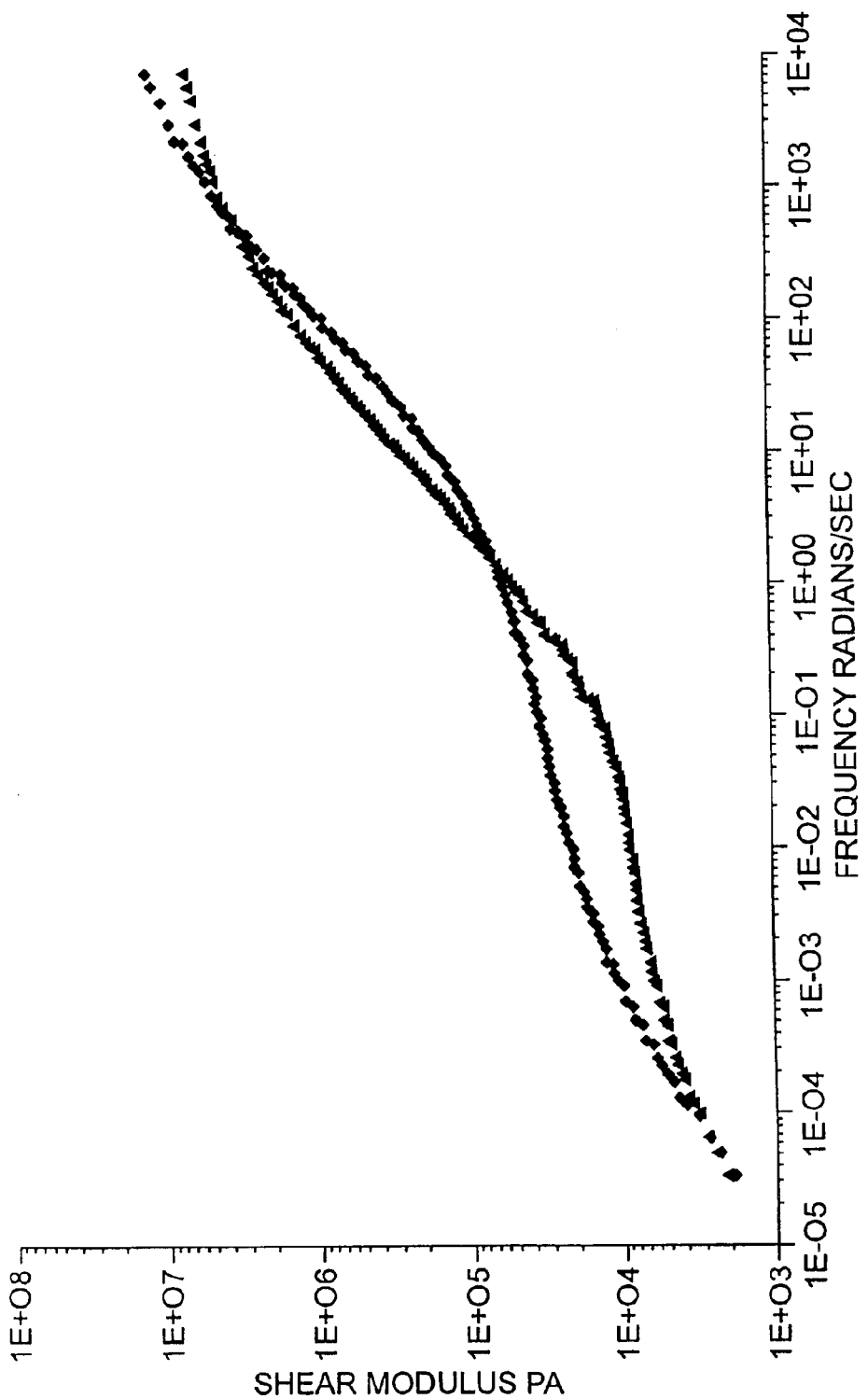
FIG. 2 is a representative depiction of a master shear modulus curve.

In general, the properties of the adhesives can be characterized by a shear modulus master curve that can be generated by a dynamic mechanical rheometer such as a Rheometrics RDA2 or a Bolin Vor using techniques discussed in detail in JD Ferry's *Viscoelastic Properties of Polymers*, 2d Ed., pp. 292–319. The curves generally have an elongated "S" shape. A representative, non-specific shear modulus curve is shown in FIG. 2. This curve does not depict the properties of any particular PSA but is used to illustrate the important features of the curve.

The two quantities plotted versus reduced frequency are G', the dynamic shear storage modulus (the component of stress in phase with strain) and G", the dynamic shear loss modulus (the component of stress 90° out of phase with strain).

Generally, for a typical pressure sensitive adhesive that is not fully crosslinked, three regions of mechanical response are readily accessible using this technique. These regions are:

a) A portion of the transition region (i.e., the transition from glassy-like to rubbery-like behavior), where the viscoelastic response of the polymer in the adhesive is believed to be dominated by configurational changes between entanglement loci of the polymer chains. In this region, the material exhibits a strong modulus dependency on frequency and has perfectly elastic mechanical properties. A vehicle tire impacting the PSA marker in this region generally causes no permanent deformation in the PSA. A PSA having a relatively long transition region will provide a DRPM with good resistance to impact shear. Preferred PSAs have a transition region that extends to 0.01 second or longer (100 Rad/sec or less).

b) The plateau region, where viscoelastic behavior is believed to be the result of a combination of molecular chain rearrangements occurring between entanglement loci and also beyond entanglement sites. In this domain modulus of the polymer is less dependent on time.

c) The rubbery flow and flow region, where it is believed that very large scale molecular motions occur, resulting in the destruction and reformation of the polymer's entanglement network. The absence or presence of the flow region and its location on the frequency scale, it is believed, can greatly affect the long term adhesion of the markers to the road surface. In this region, the PSA flows and creeps around bits of aggregate and into cracks on the road to form a continuous bond with the surface. While not bound by any theory, we believe that this behavior can only occur if the PSA does not have a full three dimensional network. The PSAs used in the invention therefore are not completely cured but receive only enough radiation exposure to form a stable PSA.

The exact shape of the modulus curve is determined by factors such as chain stiffness characteristics of the base polymer (including steric factors), molecular weight and molecular weight distribution of the polymer, the presence of tackifying resins or plasticizers in the adhesive and the degree of crosslinking. If the adhesive is crosslinked to such a degree that a fully developed three-dimensional network is present in the adhesive, it will not exhibit a rubbery flow region as depicted in FIG. 2, but rather the shear moduli at very long times or very low frequencies will eventually attain an equilibrium value.

The position of the curve is dependent on the temperature at which the modulus data is taken. This temperature is called the "reference temperature". All the data presented herein are taken at a 25° C. reference temperature unless otherwise specified. If the reference temperature is lowered there will be a general horizontal shift of the "S" shape to the left on the frequency axis and if the reference temperature is increased there will be a general shift to the right. The shape of the curve is generally unaffected by changing reference temperature.

The properties of an adhesive under the conditions likely to be encountered in a durable raised pavement marking application can be generally characterized by determining the shear modulus of the adhesive at a variety of frequencies. For example, the modulus of the adhesive at frequencies of less than about 0.01 radians per second is indicative of the long term bond formation properties of the adhesive. Typical Modulus values in this range are generally $5\times10^4$ to $1\times10^3$ Pa. The tamping frequency is considered to be about 0.01 to 100 radians per second and includes the events of initial application of the marker to the road, vehicle traffic at speeds up to about 10 miles per hour and vehicles stopping momentarily on top of the marker. At the frequency of about 1 rad/sec the PSA preferably has a shear modulus of about $2\times10^4$ to $1\times10^5$ Pa. At about 100 rad/sec, the PSA preferably has a shear modulus of about $2\times10^5$ Pa or greater, more preferably $5\times10^5$ Pa or greater. Normal impact frequency is generally about 100 to 1000 radians per second and includes impacts generated by vehicles traveling at about 10 miles per hour to greater than 90 miles per hour. Preferably, the PSA has a shear modulus of about $2\times10^5$ to $5\times10^7$ Pa in this region.

For the PSA to have all of the characteristics needed in a durable raised pavement marker, the transition region of its shear modulus curve should end at impact frequency below 100 rad/sec. In addition, the modulus curve in the frequency domain of less about 0.01 rad/sec preferably is sloping down, which is an indication of long term bond maintenance. A PSA having these properties will be able to form a strong initial bond to the roadway surface and maintain adhesion to the road under normal use conditions.

The pressure-sensitive adhesives useful in the invention have been found to have the above-mentioned shear modulus properties. There are generally five types of materials that can be readily used as base polymeric materials for the PSA. These are acrylates such as isooctyl acrylate, isobornyl acrylate and acrylic acid;, poly-α-olefins such as polyoctene and polypropylene; polybutadiene; block copolymers of styrene and butadiene or styrene and isoprene; and natural rubber. Some adhesives disclosed in U.S. patent application Ser. Nos. 08/760,356 and 08/489,135 may meet the criterion set out in this document for providing a PSA that allows a raised pavement marker to demonstrate extraordinary durability when adhered to a road.

The PSAs useful in the markers of the invention may contain a tackifier in an amount that is sufficient to give the adhesive the necessary bond forming and bond maintenance properties. While the exact amounts depend on the base elastomer and other materials used, in general the amount ranges from about 10 to 60 wt-% of the composition, based on the total composition weight.

Any of the known tackifiers may be used in the preparation of the PSA. Examples of useful types of tackifiers include the terpenes, terpene phenolics, hydrocarbon resins, and rosin esters. Suitable non-phenolic tackifiers include one or more abietic acid types such as abietic acid, neoabietic acid, palustric acid, dihydroabietic acid, tetrahydroabietic acid, dehydroabietic acid and their esters and pimaric acid types such as pimaric acid, isopimaric acid, dehydrated versions thereof, and their esters. The esters of pimaric acid and abietic acid type tackifiers are generally made by reacting the acid with a polyol such as pentaerythritol, glycerin, ethylene glycol, and so on. Commercially available examples of non-phenolic tackifiers include ESTER GUM 8D, HERCOFLEX 400 (both rosin esters), HERCOLYN D (a hydrogenated methyl ester), FORAL 85 (a hydrogenated glycerin rosin ester), ESTER R-95 (a pentaerythritol rosin ester) and FORAL 105 (a hydrogenated pentaerythritol rosin ester), all available from Hercules Chemical Co., Wilmington, Del.

Useful non-phenolic terpene tackifiers include the pinenes, such as α-pinene, β-pinene, limonene, and the like. Examples of such materials include the PICCOLYTE and PICCOFYN series of products, available from Hercules Chemical Co.

Suitable aliphatic resins include those derived from cis-piperylene, isoprene, 2-methylbutene, 2-dicyclopentadiene, and so on. Commercially available aliphatic resin tackifiers include WINGTOCK 10 and 95, available from the Goodyear Chemical Co., Akron, Ohio and ESCOREZ 1310 and 5300, available from the Exxon Chemical Co.

Examples of suitable aromatic resins include those derived from indene, styrene, methylindene, methylstyrene, and the like. The resins may be hydrogenated if desired for improved stability and/or compatibility. Commercially available versions include PICCOVAR AP-25 and REGAL-REZ 1094, both available from Hercules Chemical Co., and ESCOREZ 7105, available from Exxon Chemical Co.

Other ingredients can be included in the PSA so long as they do not adversely interfere with the adhesive's ability to bond to the road surface and to maintain adhesion to the road over time. Examples of additional ingredients include plasticizers, antioxidants, fillers, and the like. The amounts of such ingredients used can vary with the intended application and with the particular ingredients employed in the composition, provided that the resulting adhesive has the shear modulus characteristics described earlier.

The PSAs can be produced by known processes. A preferred process employs a continuous compounding device. A number of such devices are known, and can be a single unit or a series of units interconnected so as to continuously process the adhesive composition. The device should have a sequence of alternating, interconnected conveying and processing sections.

An example of a continuous compounding device useful to prepare the PSAs used in the invention is a twin screw extruder having a sequential series of conveying and processing zones. A plurality of input openings are preferably provided along the length of the extruder to facilitate the addition of various materials. Additions of material are made through the input ports to a partially full conveying zone or zones. A melt pump and filter may be present either as an integral part of the extruder, or as a separate unit to facilitate both the removal of the adhesive from the compounding device and the removal of unwanted contaminants from the adhesive stream.

In preparing the PSAs of the invention, the selected base elastomer is added to a first conveying zone of the compounding device at a controlled rate so that the elastomer does not completely fill the zone. The elastomer may be pelletized by grinding or extrusion pelletization prior to being fed to the compounding device. Alternately, it may be fed directly into the compounding device without grinding or pelletization using a device such as a Moriyama™ extruder. If the elastomer has been pelletized, it preferably is treated with a material such as talc to prevent agglomeration of the pellets.

The elastomer is then transported by the first conveying zone to a first processing zone where it is masticated. The first processing zone typically is designed to be essentially completely full and to masticate the elastomer. Additionally, the processing zone conveys the elastomer to the next zone. It may be desirable to provide the first processing zone as at least two discrete processing sections separated from each other by a transporting section. This permits the elastomer to be masticated in steps, with cooling of the masticated elastomer between each step.

If two or more elastomers are to be processed they can both be added to the first conveying zone and masticated in the first processing zone. Alternatively, the elastomers can be added sequentially to different conveying zones with sequential mastication after each elastomer addition. Sequential elastomer addition to different conveying zones can also be employed when a single elastomer is used.

Mastication is preferably carried out in the absence of materials that lubricate the elastomer. This does not, however, preclude the presence of small amounts of such materials, provided that the amount present does not effectively reduce the rate of mastication. Certain other solid adjuvants, such as talc, inorganic fillers, antioxidants, and the like, may be fed to the compounding device such that they are present during mastication.

The masticated elastomer then passes from the first processing zone to a second conveying zone. As with the first conveying zone, the second conveying zone is not completely filled by the elastomer. Tackifier and other optional additives are fed to the second conveying zone. The resulting mixture is conveyed to the next processing zone where they are mixed to form a blend of the materials. A number of techniques can be used to feed these materials to the compounding device. For example, a constant rate feeder can be used to add solid materials. Heated pail unloaders, gear pumps, and other appropriate equipment for feeding liquids at a controlled rate can be used to feed the liquids to the compounding device. Additives present at low concentration can be pre-blended with one or more of the other components for more accurate addition.

Although substantially all mastication occurs in the first processing zone, there may be some mastication which occurs in subsequent processing of the elastomer through the compounding device. This additional mastication can occur in subsequent conveying or processing zones. In any event, the degree to which the elastomer must be masticated varies with each elastomer employed and the exact formulation of the adhesive. Generally, the elastomer must be sufficiently masticated to permit subsequently added tackifiers and any other adjuvants to be satisfactorily mixed into the elastomer to form a blend and permit the blend to be extruded as a stream that is essentially free from both rubber particles and from visually identifiable regions of unmixed tackifier or other adjuvants—see U.S. Pat. No. 5,539,033 to Bredahl.

Once the masticated elastomer, tackifier, and any other adjuvants have been formed into the blend, the composition is considered to be an adhesive. The adhesive typically has a viscosity at the processing temperature in the range from 500 Poise to 5000 Poise, measured at a shear rate of 1000 $sec^{-1}$, although higher viscosities are possible. The processing temperature of the adhesive is typically in the range of 100 to 200° C.

The acrylate, poly-α-olefin and butadiene homo- and co-polymer based PSAs are cured after formulation and before being placed on the marker to provide a partially cross-linked polymeric network. Although any appropriate curing method can be used, including chemical crosslinking and exposure to radiation, a preferred method is exposure to electron beam radiation. When an electron beam is used as the source of radiation, it is preferred to expose the adhesive to about 2 to 8 (Mrad) of radiation. The exact dose is determined by factors such as the elastomer used, the thickness of the layer of adhesive to be cured, and so on.

The PSA pads used with the durable raised pavement markers can be made with a pure adhesive pad or with a composite adhesive pad. The pure pad consists only of adhesive, while the composite pad is a sandwich construction consisting of a conformance material in the middle between two PSA layers.

A durable raised pavement marker that uses a pure adhesive pad can be made by a number of methods. For example, a small sheet of pure PSA can be made by laminating a thin film of PSA, from 10–160 grains per 24 square inches, preferably 10–35 grains per 24 square inches onto a release liner, to achieve the desired thickness of about 80 to 125 mils. The adhesive is cured, and the sheet is wound into rolls. The sheet is then slit into smaller rolls of any desired width. The rolls of adhesive can then be cut into pads. To make the pure pad PSA marker, the bottom of the marker is adhered to the pad on the side that has no liner. If the PSA has another liner laminated on top, one liner is peeled off before performing this step. The PSA pad can also be extruded directly onto the base of the marker if desired.

Markers using a composite pad can also be made in a number of ways. The PSAs and conformance layers are often available in roll form. The PSA is laminated to the top and bottom of the conformance layer. The sandwiched sheet or roll is then cut into pads to about the same dimension as the base of the markers. The sandwiched pads are adhered to the bases of the markers to complete the assembly of the PSA DRPMs.

Another way to prepare the composite pads for the PSA DRPMs uses both extrusion and lamination. The PSA is extruded onto a liner. The conformance layer is laminated to the adhesive. A second extruded PSA on a liner material is then laminated onto the other side of the conformance layer and the composite is wound into rolls. The finished roll will have PSAs that can be the same or different on both sides of the conformance layer. The rolls can then be cut to smaller widths as desired. Finally, the sandwiched pads can be cut and adhered to the bases of the markers to complete the PSA DRPM assembly.

Yet another way to make the PSA DRPMs is to extrude a first PSA film onto the base of the marker. The conformance layer is laminated to the PSA on the base of the marker, and a second coat of PSA applied on top of the conformance layer. A release liner can then be laminated on top of the PSA layer to prevent it from sticking onto itself. The PSA DRPM can then be made by cutting around the marker using a steel rule die, water jet, or laser cutting tool.

Because the acrylate, poly-α-olefin and butadiene homo- and co-polymer based PSAs used in the markers of the invention are relatively soft, they are preferably used in combination with a conformance layer to increase the bulk shear strength of the PSA. This conformance layer can be made of a rubbery material such as nitrile rubber combined with inorganic fillers, or a recycled material made using scraps and other materials left over from the manufacture of these layers. See U.S. Pat. No. 4,988,541 to Hedblom.

The properties of the conformance layer materials can be characterized by force versus displacement curves of the type that would be generated if one ran the tensile test according to ASTM D790. The yield points of the conformance layers that have given us good field test results lie between about 13.3 to 31.1 Newtons (N). The recycled materials have yield points of about 13.3 N, and the virgin materials have yield points of about 31.1 N.

The thickness of the PSA layer is an important consideration for the PSA DRPMs. And roughness of the road surface is an important factor for selecting the thickness of the PSA pad. For instance, if the exposed aggregate leaves gaps as deep as 12 mm in the pavement surface, then the PSA layer should be at least 12 millimeters (mm) thick in order for the PSA to completely contact the road surface. Fortunately, the majority of surfaces are fairly smooth such that PSA layer thicknesses of about 1 to 4 mm, preferably about 1.27–3.18 mm are sufficient for adhering the markers to the road surfaces. If necessary, multiple thin layers of PSA can be built up to the desired thickness. We have found that if air is entrapped in the PSA, the desired pad thickness can be achieved with less PSA. To achieve this effect, air can be injected into the molten PSA material during extrusion or a blowing agent can be incorporated in the PSA so that the extrusion process foams the PSA. The adhesive thickness can be varied for each side of a composite pad. For example, the PSA layer that adheres to the base of the marker can be about 0.1 to 0.4 mm thick, while the PSA layer that adheres to the road can be about 0.2 to 0.7 mm thick to accommodate non-uniform pavement surfaces.

The PSA durable raised pavement marker can be manufactured using a variety of different methods. For example, the adhesive can be provided in roll form with a release liner on one or both sides, the release liner is peeled off and the marker adhered to the pads in line. The individual markers can then be cut using a die-cut, a laser, or a water cut from the strip of adhesive/markers. The adhesive may be extruded directly onto the marker base if desired. Further, the adhesive pads may be provided with a release liner, the adhesives may be applied directly to the road surface and the marker then placed on top of the adhesive pad with application of suitable pressure. The method of application may be selected according to the use conditions, including the type of road surface, the geographical location, the temperature and weather conditions, and other factors known to those skilled in the art.

The invention is further described by reference to the following examples, which are understood to describe the invention but not limit it in any way.

Because many of the materials used in the formulations of the examples are commercially available products, the following table is provided for ease of identification of the components:

| Material | Description | Supplier |
|---|---|---|
| Irganox 1010 | Antioxidant | CIBA ADDITIVES, Tarrytown, NY |
| Natural Rubber | | The Goodyear Tire & Rubber Company, Akron, OH |
| Piccolyte S-115 | B-pinene tackifier | Hercules Incorporated, Wilmington, DE |
| Acetobenzo-phenone | photoinitiator | |
| Exxon 3505 Polypropylene | | Exxon Chemical Company Polymers Group, Houston, TX |
| Foral 85 | C-5 hydrocarbon tackifier | Hercules Incorporated, Wilmington, DE |
| IOTG | photoinitiator | Evans Chemetics, Waterloo, NY |
| Irgacure 651 | photoinitiator | CIBA ADDITIVES |
| KB-1 | photoinitiator | Sartomer Company, Inc., Exton, PA |
| Regalrez 1094, 1126, 6108 | hydrocarbon tackifier | Hercules Incorporated, Wilmington, DE |
| Tinuvin 622 | UV Stabilizer | Ciba Geigy, Inc. |
| Wingtack Plus | hydrocarbon tackifier | The Goodyear Tire & Rubber Company |
| XL-330, 353 | cross-linker | 3M Company, St. Paul MN |
| Piccolyte A135 | α-pinene tackifier | Hercules Incorporated |
| Escorez S1102 | C5 hydrocarbon tackifier | Exxon Chemical Company Polymers Group |

Preparation of PSA Formulations

The following pressure-sensitive adhesive formulations were prepared by combining the listed ingredients at room temperature (25° C.) and feeding through an extruder. All percentages are weight percentages based on the total weight of the composition.

| Composition. | Ingredient | Wt-% |
|---|---|---|
| A | Regalrez 1126 | 32.88 |
| | Polyoctene | 66.77 |
| | Tinuvin 622 | 0.10 |

-continued

| Composition. | Ingredient | Wt-% |
|---|---|---|
| | Irganox B561 | 0.10 |
| | XL-353 | 0.15 |
| B | Regalrez 1094 | 39.86 |
| | Polyoctene | 59.79 |
| | Tinuvin 622 | 0.10 |
| | Irganox B561 | 0.10 |
| | XL-353 | 0.15 |
| C | Natural Rubber | 44.25 |
| | Piccolyte S-115 | 55.31 |
| | Irganox 1010 | 0.44 |
| D | Iso-octyl Acrylate | 63.15 |
| | Isobornyl Acrylate | 19.11 |
| | Acrylic Acid | 0.83 |
| | KB-1 | 0.17 |
| | XL-330 | 0.12 |
| | Regalrez 6108 | 16.62 |
| E | Iso-octyl Acrylate | 79.17 |
| | Isobornyl Acrylate | 3.96 |
| | Acrylic Acid | 0.20 |
| | Regalrez 6108 | 16.67 |
| | (cured by exposure to 5 MRad of e-beam radiation) | |
| F | Iso-octyl Acrylate | 79.17 |
| | Isobornyl Acrylate | 3.96 |
| | Acrylic Acid | 0.20 |
| | Regalrez 6108 | 16.67 |
| | (cured by exposure to 7 MRad of e-beam radiation) | |
| G | Iso-octyl Acrylate | 83.83 |
| | Acrylic Acid | 2.59 |
| | Foral 85 | 12.96 |
| | Irgacure 651 | 0.52 |
| | IOTG | 0.01 |
| | Acetobenzophenone | 0.08 |
| H | Iso-octyl Acrylate | 83.83 |
| | Acrylic Acid | 2.59 |
| | Foral 85 | 12.96 |
| | Irgacure 651 | 0.52 |
| | IOTG(chain transfer agent) | 0.01 |
| | Acetobenzophenone | 0.08 |
| I | Polyoctene | 58.37 |
| | Wingtack Plus | 31.43 |
| | Exxon 3505 Polypropylene | 5.39 |
| | Tinuvin 622 | 0.9 |
| | Irganox B561 | 0.9 |
| | Irganox 1010 | 0.90 |
| | Irgafos 168 | 3.59 |
| | t-Butylanthroquinone | 0.13 |
| J | Piccolyte A135 | 53.24 |
| | Irganox 1010 | 0.46 |
| | Butadiene | 46.29 |
| K | Piccolyte A135 | 53.24 |
| | Irganox 1010 | 0.46 |
| | Butadiene | 46.29 |
| L | Natural Rubber | 49.75 |
| | Piccolyte S-115 | 49.75 |
| | Irganox 1010 | 0.50 |
| M | Natural Rubber | 55.25 |
| | Piccolyte S-115 | 44.20 |
| | Irganox 1010 | 0.50 |
| N | Butadiene/SBR rubber in a 4/1 weight ratio | 38.76 |
| | Piccolyte A135/Escorez S1102 (4/1 weight ratio) | 48.45 |
| | Carbon black | 12.79 |
| O | Iso-octyl Acrylate | 65.39 |
| | Isobornyl Acrylate | 9.23 |
| | Acrylic Acid | 2.30 |
| | Foral 85 | 23.08 |
| P | Iso-octyl Acrylate | 66.67 |
| | Isobornyl Acrylate | 14.16 |
| | Acrylic Acid | 2.50 |
| | Foral 85 | 16.67 |

Figure 3A:
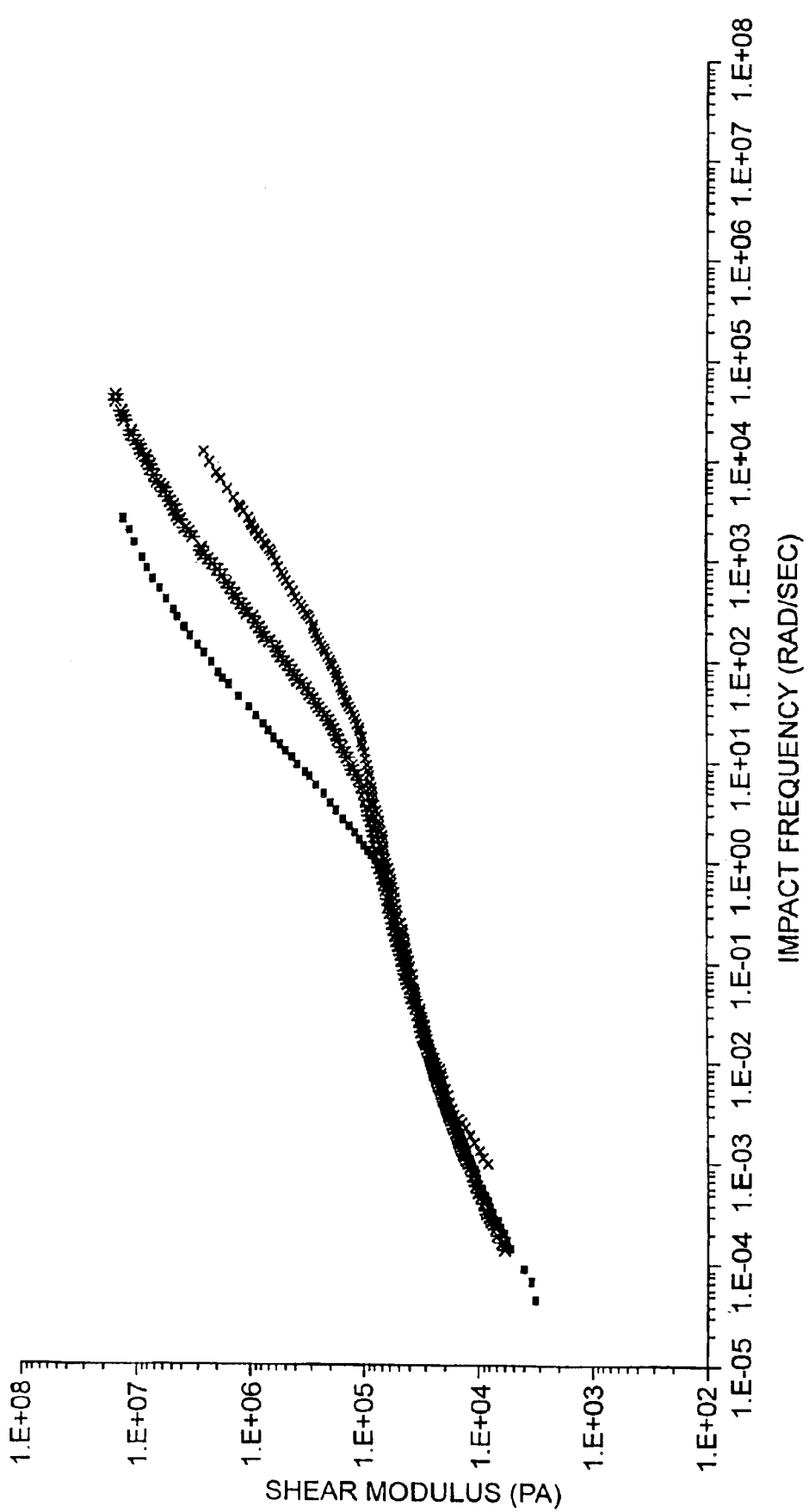
FIGS. 3a–3d show the shear modulus master curves for various pressure-sensitive adhesives that are useful in the invention.
Figure 3B:
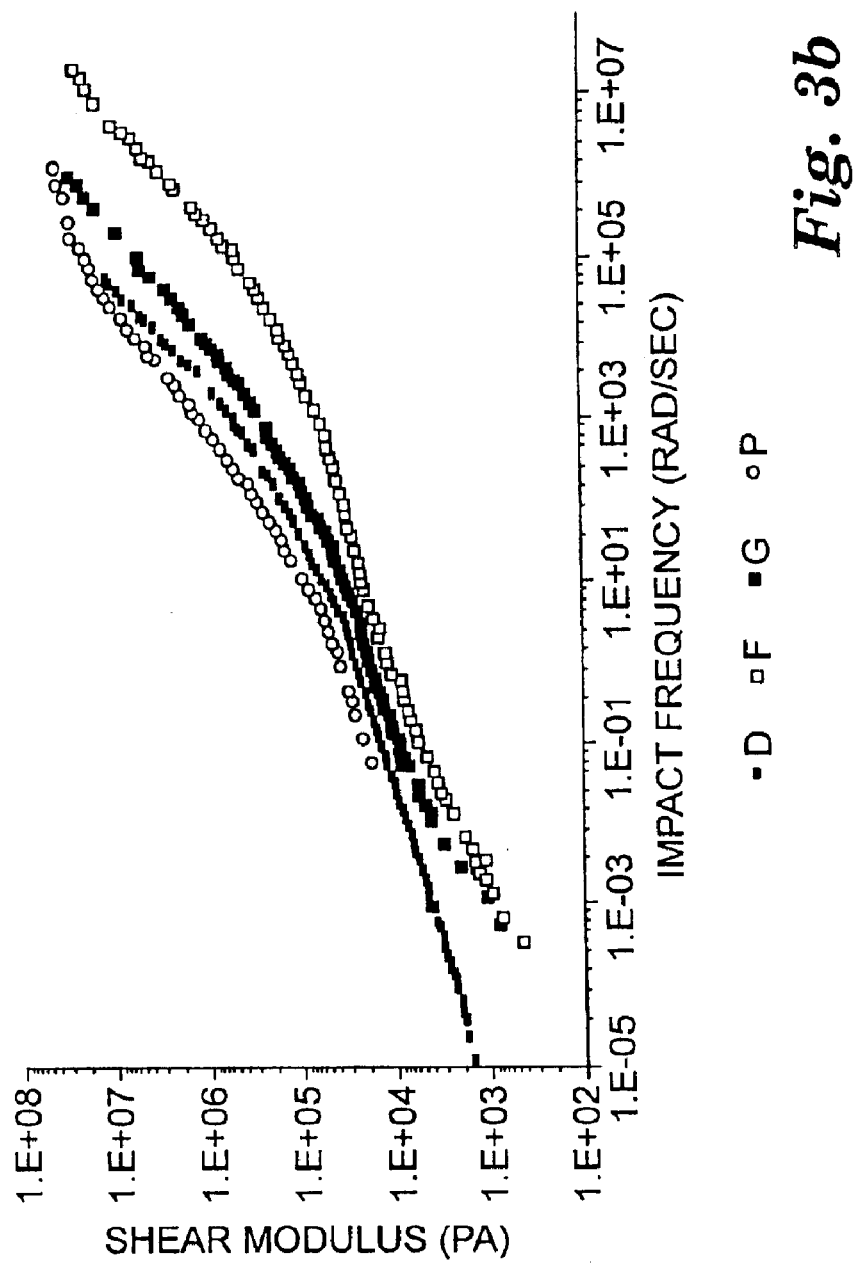
Figure 3C:
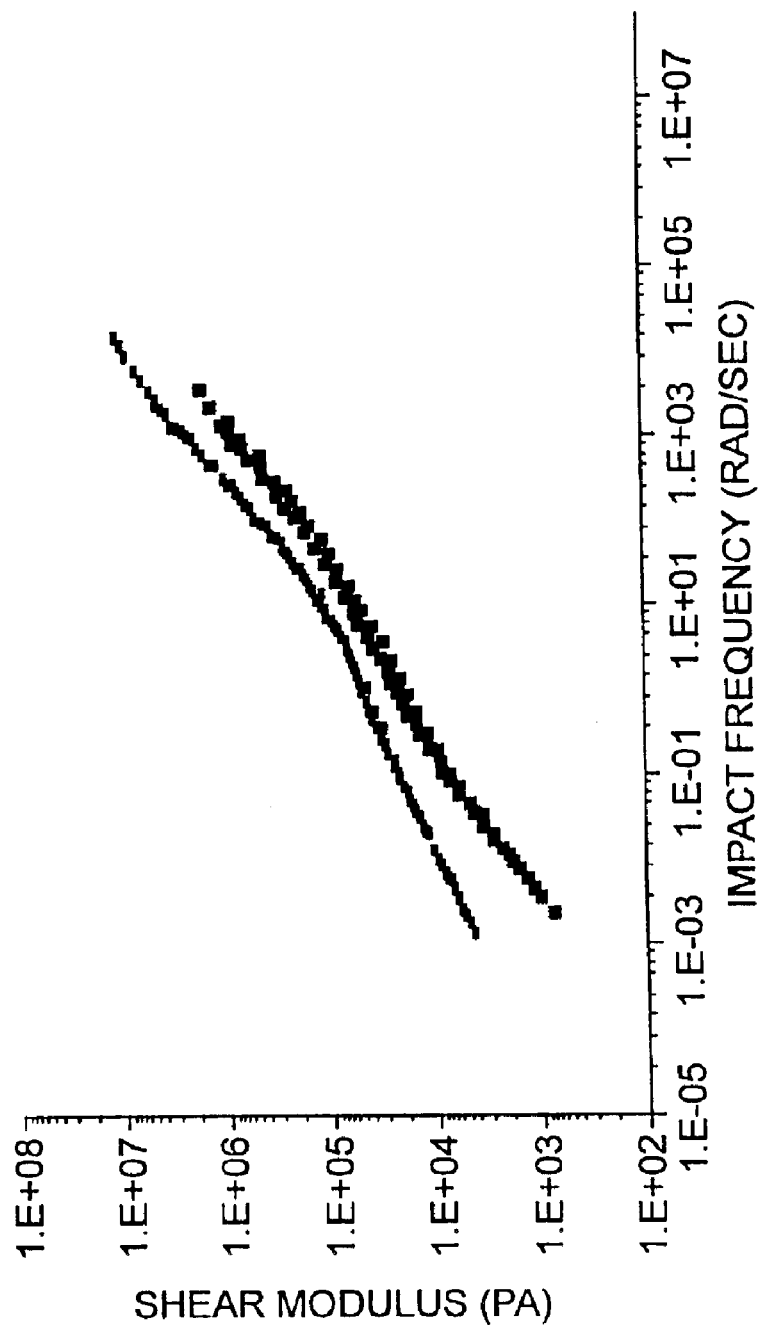
Figure 3D:
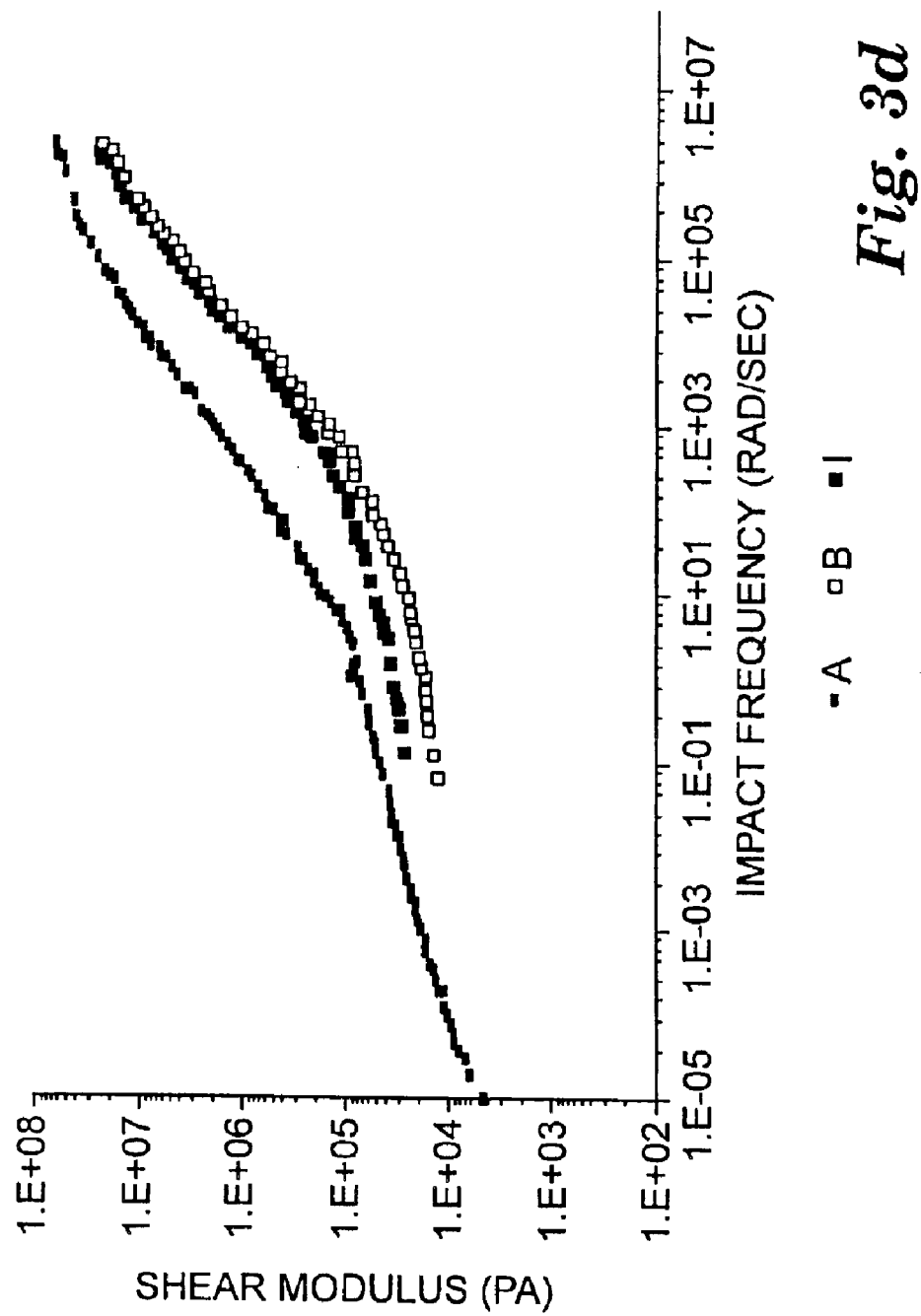

The shear modulus master curves for selected adhesives are found in FIGS. 3a to 3d. FIG. 3a shows curves for representative formulations based on natural rubber; FIG. 3b shows curves for representative formulations based on acrylates; FIG. 3c shows curves for representative formulation based on poly-α-olefins; FIG. 3d shows curves for representative polybutadiene containing formulations.

Other embodiments are within the following claims. For example, the pavement marking articles can be applied to cover or obliterate existing pavement markings. It is further contemplated that the surface of the pavement marking articles on which the acrylate adhesive composition is provided may include an adhesive that is different from the acrylate adhesive, i.e., the acrylate adhesive may be provided on a coating of adhesive, e.g., polybutadiene adhesive. All of the patents and patent applications cited above are wholly incorporated by reference into this document.

What is claimed is:

1. A raised pavement marker that comprises:
   (a) a pavement marker body having upper and lower surfaces and an apparent flexural modulus of at least about 50,000 psi and
   (b) a pressure sensitive adhesive layer disposed upon the lower surface of the marker, wherein the adhesive has:
      (i) a transition region that begins at a frequency of about 10,000 radians/s or more and extends to a frequency of about 100 radians/s or less at about 25° C.;
      (ii) a minimum shear modulus of about $1 \times 10^5$ Pa at an impact frequency of about 100 radians/s at 25° C.; and
      (iii) a shear modulus value of about $1 \times 10^4$ to $2 \times 10^5$ Pa at a frequency of 1 rad/sec at 25° C.; and the adhesive composition comprises about 40 to 60 wt-% polybutadiene and about 40 to 60 wt-% tackifier.

2. The raised pavement marker of claim 1 further comprising a conformance layer.

3. The raised pavement marker of claim 2 wherein the conformance layer has a tensile yield point of about 13 to 30 N.

4. The raised pavement marker of claim 1 wherein the adhesive comprises about 32 wt-% polybutadiene; about 8 wt-% of a styrene/butadiene copolymer about 40 wt-% of an α-pinene tackifier and about 10 wt-% of a hydrocarbon tackifier.

5. The raised pavement marker of claim 1 wherein the marker is a multi-component marker.

6. The raised pavement marker of claim 1 wherein the marker is a one-piece molded marker.

7. The raised pavement marker of claim 1, wherein the pressure sensitive adhesive has a shear modulus of about $2 \times 10^4$ to $1 \times 10^5$ Pa at a frequency of 1 rad/sec at 25° C.

8. The raised pavement marker of claim 1, wherein the pressure sensitive adhesive has a shear modulus of about $2 \times 10^5$ Pa or greater at a frequency of 100 rad/sec at 25° C.

9. The raised pavement marker of claim 1, wherein the pressure sensitive adhesive has a shear modulus of about $5 \times 10^5$ Pa or greater at a frequency of 100 rad/sec at 25° C.

10. The raised pavement marker of claim 1, wherein the pressure sensitive adhesive has a shear modulus of about $2 \times 10^5$ to $5 \times 10^7$ Pa at a frequency of 100 to 1000 rad/sec at 25° C.

11. A marked road surface, comprising a raised pavement marker of claim 1 adhered to the road surface.

* * * * *

UNITED STATES PATENT AND TRADEMARK OFFICE
CERTIFICATE OF CORRECTION

PATENT NO.    : 6,861,141 B2
DATED         : March 1, 2005
INVENTOR(S)   : Buccellato, Gina M.

It is certified that error appears in the above-identified patent and that said Letters Patent is hereby corrected as shown below:

Title page,
Item [76], Inventors, should read as follows:
-- Gina M. Buccellato, Eagan, MN (US); Cristina U. Thomas, Woodbury, MN (US); Bimal V. Thakkar, Woodbury, MN (US); Greggory S. Bennett, Hudson, WI (US); Sithya S. Khieu, Eden Prairie, MN (US); Gary R. Miron, St. Paul, MN (US) --

Column 1,
Line 2, after "1998" delete "ABN".

Column 22,
Line 42, after "copolymer" insert -- ; --.
Line 48, after "one-piece" insert -- , --.

Signed and Sealed this

Seventeenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,861,141 B2
DATED : March 1, 2005
INVENTOR(S) : Buccellato, Gina M.

It is certified that error appears in the above-identified patent and that said Letters Patent is hereby corrected as shown below:

Title page,
Insert Item -- [73] Assignee, 3M Innovative Properties Company, St. Paul, MN (US) --.

Signed and Sealed this

Twentieth Day of December, 2005

JON W. DUDAS
*Director of the United States Patent and Trademark Office*